Nov. 14, 1967     E. H. CUMMINGS     3,352,139
THREADING IMPLEMENT
Filed Sept. 18, 1964     3 Sheets-Sheet 1
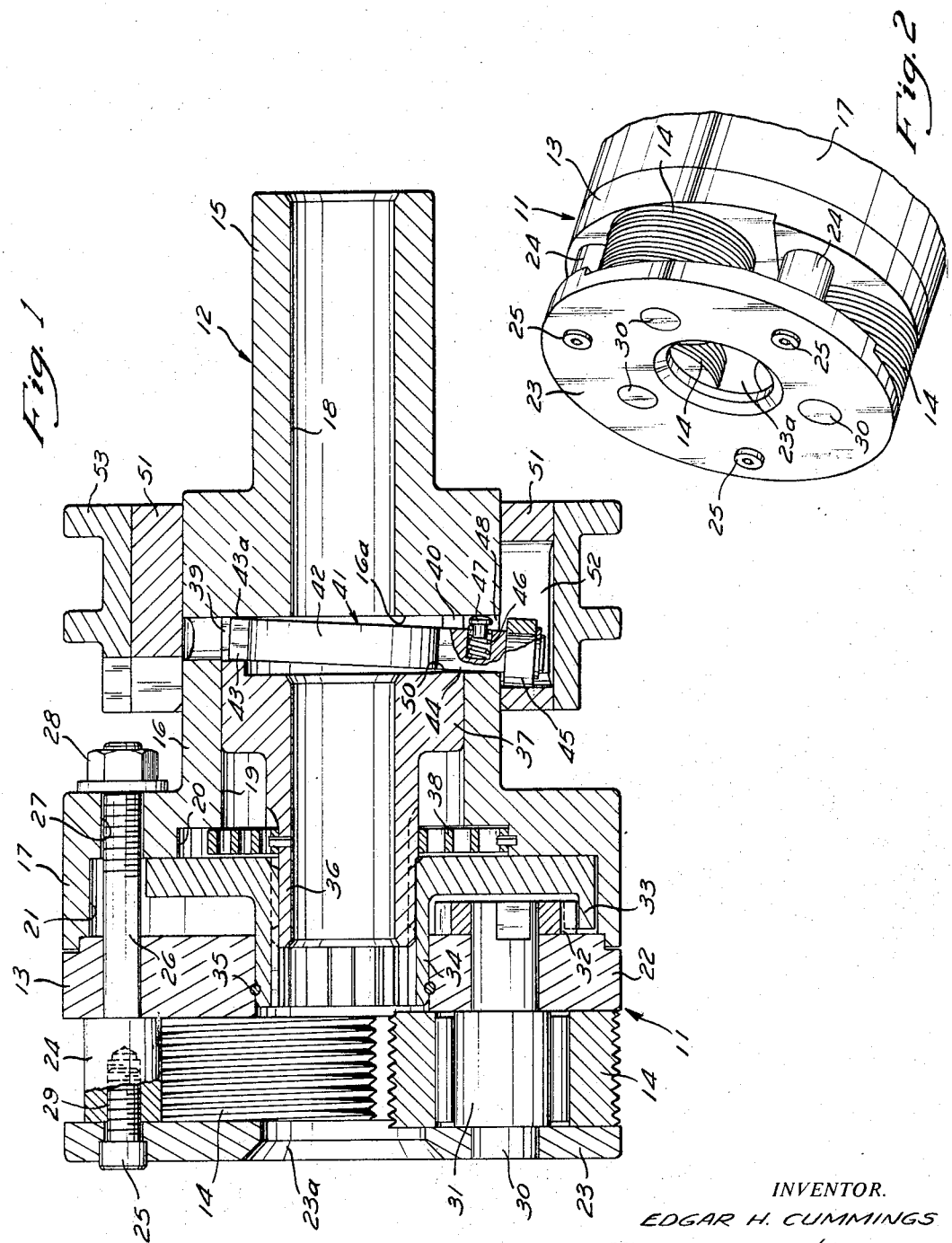
INVENTOR.
EDGAR H. CUMMINGS
BY Woodling, Krost,
Granger and Rust
ATTORNEYS

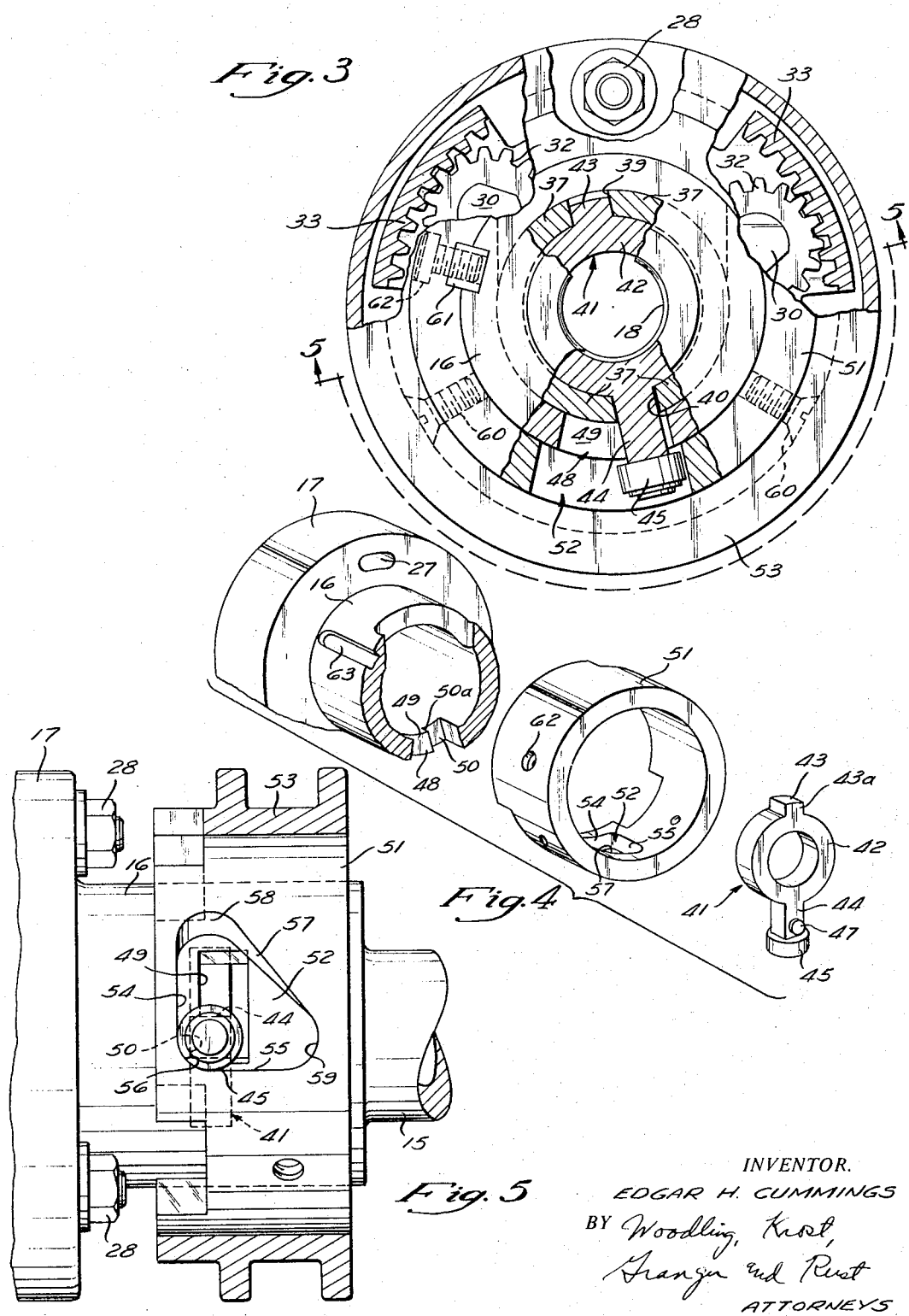

Nov. 14, 1967  E. H. CUMMINGS  3,352,139

THREADING IMPLEMENT

Filed Sept. 18, 1964  3 Sheets-Sheet 3

INVENTOR.
EDGAR H. CUMMINGS

BY Woodling, Krost,
Granger and Rust
ATTORNEYS

United States Patent Office 3,352,139
Patented Nov. 14, 1967

3,352,139
THREADING IMPLEMENT
Edgar H. Cummings, Cleveland, Ohio, assignor to The
National Acme Company, a corporation of Ohio
Filed Sept. 18, 1964, Ser. No. 397,419
7 Claims. (Cl. 72—123)

ABSTRACT OF THE DISCLOSURE

The invention relates to a threading implement wherein drive means is provided to move threading members such as thread rolls between a released position and an engaged position on a workpiece. An operating means is movable longitudinally and has a cam slot to trip a clutch so that a spring releases or opens the implement to permit removal of the finished workpiece. Also upon return movement of the operating means, an inclined edge of the cam slot cams the clutch rotatively to an engaged position whereat the implement is closed, ready to thread another workpiece.

This invention relates to a threading implement for forming threads on a workpiece.

Prior to the present invention there has been a need for a practical and effective operating mechanism for controlling the "opening" and "closing" of a rotating threading implement under the control of a non-rotating yoke which is mounted for relative longitudinal movement with respect to the threading implement. Rotating threading implements, such as thread rolling heads, commonly are mounted in a rotating chuck or spindle of a machine tool for thread-forming engagement with a non-rotating workpiece. Relative axial movement between the rotating threading implement and the workpiece may be effected by advancing either or both of them axially. For insertion of the workpiece blank into the threading implement and also for removal of the threaded workpiece from the implement, the latter must be "open"; that is, its thread forming members must be positioned away from thread forming engagement with the workpiece. During the thread forming operation, of course, the threading implement must be "closed"; that is, its thread forming members must be positioned for threading engagement with the workpiece.

The present invention is directed particularly to a novel and improved operating mechanism for such threading implements to control both the "opening" and "closing" of the implement.

The operating mechanism of the present invention is particularly adapted for use in a "solid" threading implement having the shank, which is connected to the chuck or spindle of the machine tool, and a front end frame, which carries the thread forming members, rigidly connected to one another, so that there is no "float" or relative movement between them, either longitudinally or laterally.

A particular advantage of the present invention is its novel quick release characteristic, which enables the threading implement to move from its closed to its open position virtually immediately in response to a relatively short movement of one of the parts of the operating mechanism.

It is a principal object of this invention to provide a novel and improved operating mechanism in a threading implement for controlling its opening and closing.

It is also an object of this invention to provide such an operating mechanism which is particularly adapted for use in a rotating threading implement under the control of a non-rotating yoke mounted for relative longitudinal movement with respect to the threading implement.

Another object of this invention is to provide such an operating mechanism which is adapted to quickly open the threading implement, particularly a threading implement of the "solid" type.

Another object of this invention is to provide such an operating mechanism in a threading implement with a dog clutch freely movable completely to the full open position once it is tripped.

Another object of this invention is to provide such an operating mechanism in a threading implement which is durable and reliable in operation.

Another object of this invention is to provide such an operating mechanism in a threading implement which has moving parts of low mass and inertia to effect a rapid opening movement of the implement.

Other objects and a fuller understanding of this invention may be had by referring to the following description and claims, taken in conjunction with the accompanying drawings, in which:

FIGURE 1 is a longitudinal sectional view of a threading implement embodying a preferred embodiment of the operating mechanism in accordance with the invention;

FIGURE 2 is a fragmentary perspective view, on a smaller scale, showing the workpiece-receiving front end of this threading implement;

FIGURE 3 is an end elevational view, with parts broken away for clarity, taken from the rear end of the implement;

FIGURE 4 is a fragmentary exploded isometric view showing parts of the operating mechanism for controlling the opening and closing of this implement;

FIGURE 5 is a view, partly in side elevation taken from the line 5—5 in FIGURE 4 and partly in section, showing the parts of the FIGURE 4 operating mechanism while the threading implement is closed and just before it is opened;

Figure 6:
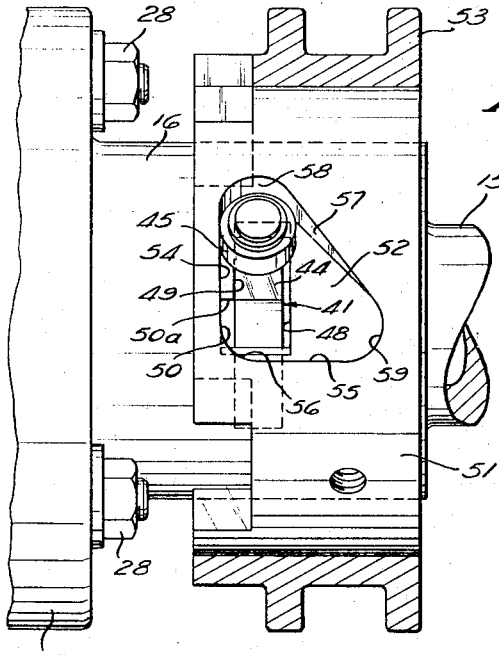
FIGURE 6 is a view similar to FIGURE 5 and showing the parts of the operating mechanism when positioned to hold the threading implement open.

Referring to FIGURE 1, the present invention is shown embodied in a thread rolling head, although it is to be understood that it may be embodied in various other threading implements which form the threads on the workpiece other than in the particular manner of the illustrated thread rolling head.

As shown, the thread rolling head 11 comprises a mounting end in the form of a shank 12 and a front end frame 13. The shank 12 is adapted to be gripped or chucked in the machine tool with which the thread rolling head is to be used. The frame 13 carries a plurality of thread rolls 14 for engagement with the workpiece to form threads thereon.

The shank 12 is an integral body having a generally cylindrical, small diameter, rear end portion 15 (at its right end in FIGURE 1), a larger diameter, generally cylindrical, intermediate portion 16, and an even larger diameter, generally cylindrical, front end portion 17. The shank has an axial bore 18 extending through its rear end portion 15, a first cylindrical counterbore 19 within its intermediate portion 16, a second, larger diameter, short counterbore 20 at the front end of the first counterbore 19, and an even larger diameter third counterbore 21 within its front end portion 17. The successive counterbores 21, 20 and 19 and bore 18 intersect one another coaxially.

The frame 13 of the thread rolling head comprises a rear plate 22 and a front plate 23 spaced axially or longitudinally in front of the rear plate by spacer studs 24 and bolts 25. Each spacer stud 24 has a reduced diameter portion 26 extending rearwardly through the rear plate 22 of the frame and through an elongated arcuate opening 27 (FIGURE 4) in the shank 12 behind the front end portion 17 on the latter. The rear end of this spacer stud portion 26 is threaded and it receives a nut 28 for clamping the rear plate 22 of the frame tightly against the front end portion 17 on the shank 12. The bolts 25 engage internally threaded recesses 29 in the front ends of the respective spacer studs 24 to clamp the front plate 23 of the frame tightly thereagainst. The front plate 23 of the frame has a central opening 23a through which the workpiece is inserted into the thread rolling head.

A plurality of thread roll spindles 30, here shown as three in number, are journalled in the front and rear plates of the frame 13. Each of these spindles has an eccentric portion 31 on which is journalled the respective thread roll 14. The axis of each spindle 30 is skewed with respect to the axis of the shank 12 and frame 13 of the thread rolling head. Each thread roll 14 has external annular grooves thereon, and the skewing of the respective spindle axis with respect to the axis of the thread rolling head is such that the three thread rolls will form the desired thread on a workpiece disposed within the thread rolling head coaxial with the axis of the latter's frame 13 and shank 12.

At its rear end (to the right in FIGURE 1), each spindle 30 carries a pinion 32 meshing with an internal drive gear 33 (FIGURE 3). The pinions 32 and the internal gear 33 together constitute a drive means rotatable with respect to the frame 13 in one direction to release the thread rolls 14 from the workpiece and rotatable in the opposite direction to engage the thread rolls with the workpiece. As shown in FIGURE 1, the three pinion 32 and the internal gear 33 are positioned within the counterbore 21 surrounded by the front end portion 17 of the shank 12. The internal gear 33 has a forwardly projecting annular extension 34 which is rotatably received in the rear plate 22 of the frame 13, with a snap ring 35 engaged between them. The internal gear 33 is splined to the front end of a drive bushing 36, which forms part of the operating mechanism of the present invention. The drive bushing has a larger diameter, cylindrical rear end 37 which is rotatably received in the first counterbore 19 formed in the intermediate portion 16 of the shank 12.

A first spring means in the form of a spiral spring 38 is connected at its outer end to the wall of the second counterbore 20 in the shank 12 and at its inner end to the drive bushing 36. This spring urges the drive bushing in said one rotational direction with respect to the shank 12 and frame 13 of the thread rolling head. Due to the splined connection of the drive bushing 36 to the internal gear 33, the latter also is urged by spring 38 in this same rotational direction.

The larger diameter rear end 37 of the drive bushing 36 presents a pair of diametrically opposed, open-ended slots 39 and 40, which are narrow circumferentially, as shown in FIGURE 3. The operating mechanism includes a clutch member in the form of an operating lever 41, which is snugly received in these slots. As shown in FIGURES 3 and 4, this operating lever has a circular midportion 42, a first radial end projection 43 snugly received in slot 39, and a second radial opposite end projection 44 snugly received in slot 40 and projecting radially beyond that slot and carrying a cam follower means in the form of a roller 45 on its outer end.

As shown in FIGURE 1, the first radial projection 43 on the operating lever is closely confined axially within slot 39, with the outer rear edge 43a of this projection slidably engaging the end wall 16a of the shank 12 radially disposed between the first counterbore 19 and the bore 18. The second radial end projection 44 on the operating lever has substantial axial play within slot 40, so that this end of the lever is capable of rocking movement longitudinally of the thread rolling head, about its first radial projection 43 as a pivot. The lever is biased counterclockwise to the position shown in FIGURE 1 by means of a second spring means comprising a compression spring 46 and a plunger 47 engaging the end wall 16a. In this position of the lever, its second radial end projection 44 abuts against the closed inner end of slot 40.

This second radial end projection 44 on the operating lever 41 also is received in a stepped arcuate slot 48 (FIGURE 4) of substantial circumferential extent formed in the intermediate portion 16 of the shank 12. This slot presents a first arcuate inner end face 49 extending circumferentially from the left side edge of this slot in FIGURE 4, and a second arcuate inner end face 50 which is offset longitudinally forwardly from the first end face 49 and extends from the latter over to the right side face of this slot in FIGURE 4. A longitudinally extending shoulder 50a is disposed between the end faces 49 and 50. The second radial end projection 44 on the operating lever 41 is adapted to engage either the end face 49 or the offset end face 50 during different portions of the cycle of operation of this mechanism.

The operating mechanism also includes operating means or an operating member in the form of an annular operating cam 51 mounted for relative longitudinal movement with respect to the intermediate portion 16 of the shank 12. This cam is formed with a generally triangular cam slot 52 which receives the roller 45 carried by the operating lever 41. An operating spool 53 carries the operating cam 51 being attached thereto by a plurality of screws 60 (FIGURE 3). This operating spool is adapted to be engaged by a non-rotatable yoke (not shown) which is mounted for relative axial movement with respect to the thread-rolling head. By such an arrangement, the spool 53 and cam 51 can be moved relatively longitudinally or axially along the intermediate portion 16 of the shank 12 of the thread rolling head. As shown in FIGURE 3, the cam 51 carries a key 61 which projects radially inwardly through an opening 62 (FIGURE 4) in the cam into a longitudinal keyway 63 in the intermediate portion 16 of the shank 12. This key arrangement restrains the cam 51 against rotation with respect to the shank 12, while permitting it to move lengthwise of the shank or vice versa.

The cam slot 52 presents a first, circumferentially extending, arcuate end face 54 which extends perpendicularly to the longitudinal axis of the assembly, a second face 55 extending longitudinally from one end of the end face 54 and joined to the latter by a rounded corner 56, and a circumferentially and longitudinally inclined face 57 extending between the opposite ends of faces 54 and 55 and joined to the latter by rounded corners 58 and 59, respectively.

The roller 45 on the operating lever 41 is a cam follower means adapted to ride over these faces of the cam slot during the sequence of operations of this mechanism, as explained hereinafter.

FIGURES 5, 6, 7 and 8 show the above-described operating mechanism at successive stages of its operation for opening and closing the thread rolls 14.

In the FIGURE 5 position, the spool 53 and operating cam 51 are partially retracted along the intermediate portion 16 of the shank 12. In this position, the second radial end extension 44 of the lever 41 engages the forwardly offset surface 50 of the slot 48 in the intermediate portion 16 of the shank, and the roller 45 engages the rounded corner 56 at the junction between the longitudinal face 55 and the circumferential face 54 of the slot 52 in cam 51. At this time, the first spring means 38 is urging the drive bushing 36 and lever 41, rotationally with respect to the shank 12 of the threading implement, clockwise in FIGURES 3 and 4 (viewed from the rear end of the implement), but the shoulder 50a at the slot 48 in the shank positively prevents the lever 41 from turning in that direction. In this rotational position of the lever 41, the drive bushing 36 and the internal gear 33, the latter maintains the thread rolling head closed; that is, the thread rolls 14 are laterally inward for threading engagement with the workpiece.

However, when the cam 51 is retracted longitudinally a slight distance farther, it will rock the lever 41 longitudinally of the assembly counterclockwise in FIGURE 1, against the bias of the second spring means 46, 47, until the second radial end extension 44 of the lever has cleared the shoulder 50a. At this point, the spring 38 will immediately (without further longitudinal movement of cam 51) rotate the drive bushing 36 and the lever 41 in unison about the longitudinal axis of the threading implement clockwise in FIGURES 3 and 4, viewed from the rear, with the roller 45 riding over the circumferential end face 54 of the cam slot 52 until it reaches the corner 58, as shown in FIGURE 6.

The just-described rotation of the drive bushing 36 is imparted to the internal gear 33, through the splined connection between them. The internal gear, in so rotating, drives the pinions 32 to rotate the respective spindles 30 in a direction to move the thread rolls 14 laterally outward, away from the axis of the threading implement. This is the "open" position of the thread rolling head, in which the thread rolls 14 are disengaged from the workpiece. As already stated, this opening of the thread rolling head takes place virtually immediately upon movement of the operating cam the slight distance axially from the FIGURE 5 position to the FIGURE 6 position. The corner 58 of the cam slot 52 does not terminate this rapid opening movement until such movement is completed. Continued axial movement of the operating cam through an appreciable axial distance is not required in order to fully release the thread rolls 14 from the workpiece. This quick release characteristic is considered an important practical advantage of the operating mechanism of the present invention.

Figure 7:
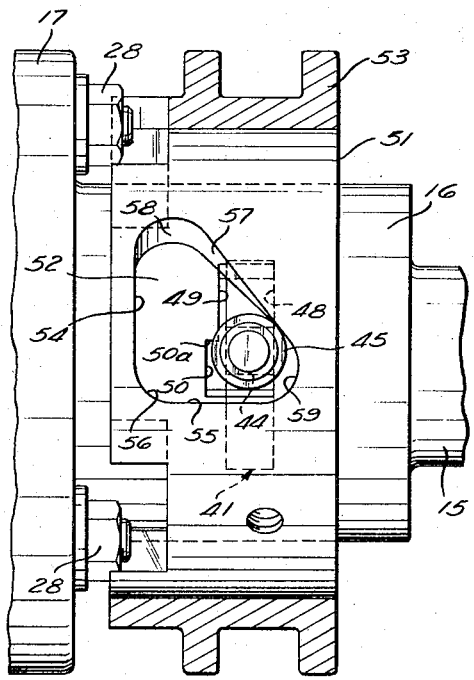
FIGURE 7 is a similar view showing the position of these parts when being moved to close the threading implement; and, FIGURE 8 is a similar view showing the position of these parts when the threading implement is fully closed.

In order to "close" the thread rolls 14 (that is, to move them laterally inwardly for engagement with the workpiece), the spool 53 and the operating cam 51 are advanced forwardly along the intermediate portion 16 of the shank from the FIGURE 6 position. As shown in FIGURE 7, as this action takes place the roller 45 rides along the inclined side face 57 of the cam slot, causing the lever 41 to gradually turn counterclockwise (viewed from the rear) about the axis of the threading implement against the urging of spring 38. Consequently, the second radial end extension 44 of the lever rides over the face 49 of slot 48 in the intermediate portion 16 of the shank 12. Such rotation of the lever 41 is imparted to the drive bushing 36, against the urging of the first spring means 38, and also to the internal gear 33. The internal gear drives the pinions 32 in a direction to gradually move the eccentrically mounted thread rolls 14 laterally inwardly toward engagement with the workpiece.

Figure 8:
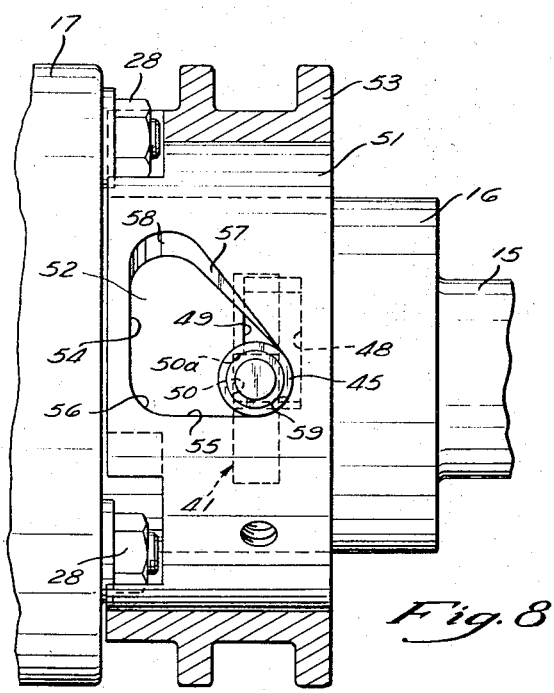

When the corner 59 of the cam slot 52 engages the roller 45, as shown in FIGURE 8, the lever 41 will have been turned a sufficient distance to position its second radial end extension 44 past the shoulder 50a and in registration with the forwardly offset surface 50 of the slot 48 in the intermediate portion 16 of the shank. At this point the second spring means 46, 47 rocks this end of the lever longitudinally forward to lock the radial end extension 44 of the lever against the offset end face 50 and the adjoining shoulder 50a of the shank slot 48. This locks the thread rolls 14 in their inwardly disposed, fully closed positions for threading engagement with the workpiece.

From this position, the thread rolls can be opened only by retracting the cam 51 to the right until the second radial end extension 44 of the operating lever is released from shoulder 50a, as described.

In addition to the novel and advantageous quick-opening characteristic already referred to, the present invention also is advantageous in that the moving parts of the operating mechanism are substantially fully enclosed by the spool 53 and the shank 12, which contributes to its reliability and ruggedness under practical operating conditions.

The moving parts of the operating mechanism which arcuately move for the rapid opening movement include the lever 41 and bushing 36 and these move the internal gear 33. It will be noted that these parts are small in mass relative to the head 11, and are also small in radius relative to the head 11 so that they have low inertia. This establishes a very rapidly opening head which does not mar the threads on the completed workpiece.

The thread rolling head may be used for either stationary applications, where the workpiece rotates, or rotating applications, where the head rotates. In the latter case the shank 12 would be chucked in a rotating spindle, and a longitudinally movable non-rotating yoke used to coact with the operating spool 53 to trip open and reset the head. Because this head is a solid head, that is, the front end frame 13 is rigidly connected to the shank 12, there is no longitudinal movement therebetween. Also the low inertia of the operating mechanism establishes not only the extremely rapid opening movement but also permits the head to be operated at higher rotational speeds than former rolling heads, without the clutch operating mechanism wearing out due to the impact at the end of the opening movement caused by spring 38.

Also, the short length of movement of the lever 41 in its unlocking movement off the shoulder 50a permits very short threads to be rolled on a workpiece, compared to prior art heads which had the shank connected to the roll-carrying front frame by a separable dog clutch.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a threading implement having a frame, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and spring means urging said drive means in said one direction, the improvement which comprises an operating mechanism for said drive means including:

clutch means coupled to said drive means for rotation therewith, said clutch means being mounted for limited rotation relative to said frame and in one rotational position being locked against rotation in said one rotational direction under the urging of said spring means;

and operating means relatively slidable longitudinally of the frame, said operating means in one direction of its relative longitudinal movement releasing said clutch means from its locked position to rotate immediately in one rotational direction along with said drive means under the urging of said spring means without continued movement of said operating means in said one direction;

said operating means in the opposite direction of its relative longitudinal movement engaging said clutch means to rotate the latter and said drive means in said opposite rotational direction against the urging of said spring means until said clutch means is re-engaged in said locked position.

2. In a threading implement having a frame with a mounting end and a front end rigidly interconnected, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and spring means urging said drive means in said one direction, the improvement which comprises an operating mechanism for said drive means including:

clutch means coupled to said drive means for rotation therewith, said clutch means being mounted for limited rotation relative to said frame and in one rotational position being locked against rotation in said one rotational direction under the urging of said spring means;

and operating means engaging said clutch means and being relatively movable with respect to the frame, said operating means in one direction of its relative movement abruptly releasing said clutch means from its locked position and permitting said clutch means to rotate immediately in one rotational direction along with said drive means under the urging of said spring means without requiring continued relative movement of said operating means in said one direction;

said operating means in the opposite direction of its relative movement rotating said clutch means and said drive means in said opposite rotational direction against the urging of said spring means until said clutch means is re-engaged in said locked position.

3. In a threading implement having a shank, a front end frame rigidly connected to the shank, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and spring means urging said drive means in said one rotational direction, the improvement which comprises an operating mechanism for said drive means including:

clutch means coupled to said drive means for rotation in unison therewith, said clutch means being mounted for rotation relative to said shank and in one rotational position being locked to said shank to restrain said drive means against rotation in said one rotational direction under the urging of said spring means;

and operating means relatively slidable longitudinally of the shank in one direction and engaging said clutch means to release said clutch means from the shank so as to permit rotation of said drive means and said clutch means in said one rotational direction under the urging of said spring means, said operating means being relatively slidable longitudinally of the shank in the opposite direction to rotate said clutch means and said drive means in said opposite rotational direction against the urging of said spring means back to said one rotational position to be locked again to the shank.

4. In a threading implement having a shank, a front end frame rigidly connected to the shank, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and first spring means urging said drive means in said one rotational direction, the improvement which comprises an operating mechanism for said drive means including:

a clutch member coupled to said drive means for rotation in unison therewith and having a portion thereof free to rock longitudinally of said shank;

said shank having a circumferentially extending slot therein slidably receiving said portion of said clutch member, said shank slot having a longitudinally offset portion at one circumferential end thereof, and second spring means biasing said portion of the clutch member longitudinally into said offset portion of said shank slot to lock said clutch member and said drive means against rotation with respect to the shank and the front end frame under the urging of said first spring means;

and operating means relatively slidable longitudinally of said shank in one direction and acting on said clutch member to release said clutch member from said offset portion of said shank slot against the urging of said second spring means to permit rotation of said drive means under urging of said first spring means in said one rotational direction.

5. In a threading implement having a shank, a front end frame rigidly connected to the shank, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and first spring means urging said drive means in said one rotational direction, the improvement which comprises an operating mechanism for said drive means including:

a clutch member coupled to said drive means for rotation in unison therewith and having a portion thereof free to rock longitudinally of said shank;

said shank having a circumferentially extending slot therein slidably receiving said portion of said clutch member, said shank slot having a longitudinally offset portion at one circumferential end thereof, and second spring means biasing said portion of the clutch member longitudinally into said offset portion of said shank slot to lock said clutch member and said drive means against rotation with respect to the shank and the front end frame under the urging of said first spring means;

an operating member relatively slidable longitudinally of the shank and coupled to said shank against relative rotation of one with respect to the other, said operating member having a cam slot therein with a longitudinally extending edge, a circumferentially extending edge extending laterally from one end of said longitudinally extending edge, and a circumferentially and longitudinally inclined edge extending betwen the opposite ends of said longitudinally and circumferentially extending edges, follower means on said portion of the clutch member engaged in said cam slot;

said operating member, when moved longitudinally in one direction, bringing said circumferentially extending edge of the cam slot into engagement with said follower means of the clutch member to withdraw said portion of the clutch member from said offset portion of the shank slot against the urging of said second spring means to permit said first spring means to rotate said clutch member and said drive means in said one rotational direction, with said follower means on the clutch member riding across said circumferentially extending edge of the cam slot from said longitudinally extending edge over to said inclined edge;

and said operating member, when moved longitudinally in the opposite direction, moving the inclined edge of the cam slot over said follower means to turn the clutch member and said drive means in the opposite rotational direction against the urging of said first spring means until said portion of the clutch member registers with said offset portion of the shank slot, whereupon said second spring means forces said portion of the clutch member into said offset portion of the shank slot to lock the clutch member and said drive means against rotation relative to the shank and the frame.

6. In a threading implement having a shank, a front end frame rigidly connected to the shank, a plurality of threading members mounted on the frame for engagement with a workpiece, drive means rotatable with respect to the frame in one direction to move the threading members to a released position for disengaging the workpiece and rotatable in the opposite direction to move the threading members to an engaged position for engagement with the workpiece, and first spring means urging said drive means in said one rotational direction, the improvement which comprises an operating mechanism for said drive means including:

a drive bushing rotatably mounted in said shank and coupled to said drive means for rotation in unison therewith;

a lever carried by said drive bushing for rotation therewith and having one end thereof free to rock longitudinally of said bushing and said shank;

said shank having a circumferentially extending slot therein slidably receiving said end of the lever, said shank slot having a longitudinally offset portion at one circumferential end thereof, and second spring means biasing said end of the lever longitudinally into said offset portion of said slot to lock said lever, said drive bushing and said drive means against rotation with respect to the shank and the front end frame under the urging of said first spring means;

an annular cam member slidable longitudinally on the outside of said shank, key means restraining said cam member and said shank against relative rotation with respect to one another, said cam member having a cam slot therein with a longitudinally extending edge, a circumferentially extending edge extending laterally from one end of said longitudinally extending edge, and a circumferentially and longitudinally inclined edge extending between the opposite ends of said longitudinally and circumferentially extending edges;

a roller on said end of the lever engaged in said cam slot;

said cam member, when moved longitudinally in one direction, bringing its circumferentially extending edge into engagemnt with said roller to withdraw said end of the lever from said offset portion of the shank slot against the urging of said second spring means to permit said first spring means to rotate said drive bushing, said lever and said drive means in said one rotational direction, with said roller on the lever riding across said circumferentially extending edge of the cam slot from said longitudinally extending edge over to said inclined edge;

and said cam member, when moved longitudinally in the opposite direction, moving the inclined edge of the cam slot over said roller to turn the lever, said drive bushing and said drive means in the opposite rotational direction against the urging of said first spring means until said end of the lever registers with said offset portion of the shank slot, whereupon said second spring means forces said end of the lever into said offset portion of the shank slot to lock the lever, said drive bushing and said drive means against rotation relative to the shank and the frame.

7. In a threading implement having a shank with a counterbore therein terminating in a forwardly-facing end wall, a front end frame rigidly connected to the shank, a plurality of threading members mounted on the frame for engagement with a workpiece, a drive gear rotatable with respect to the frame in one direction to cause the threading members to move to a released position for disengaging the workpiece and rotatable in the opposite direction to cause the threading members to move to an engaged position for engagement with the workpiece, and first spring means urging said drive gear in said one rotational direction, the improvement which comprises an operating mechanism for said drive gear including:

a drive bushing rotatably mounted in said counterbore in the shank and splined to said drive gear for rotation in unison therewith, said drive bushing having a pair of diametrically opposed, circumferentially narrow slots therein which are open at said end wall of the counterbore in the shank;

a lever having first and second opposite radial end projections which are snugly confined in said drive bushing slots in a circumferential direction for rotation of the lever in unison with the drive bushing, said first radial end projection of the lever being confined snugly in a longitudinal direction between the drive bushing and said end wall of the counterbore in the shank, said second radial end projection being free to rock longitudinally within the respective slot in the drive bushing;

said shank having a circumferentially extending slot therein which slidably receives said second radial end projection of the lever, said shank slot having a forwardly offset portion at one circumferential end thereof, and second spring means biasing said second radial end projection of the lever forwardly into said offset portion of said shank slot to lock said lever, said drive bushing and said drive gear against rotation with respect to the shank and the front end frame under the urging of said first spring means;

an annular cam member slidable longitudinally on the outside of said shank, key means restraining said cam member and said shank against relative rotation with respect to one another, said cam member having a generally triangular cam slot therein with a longitudinally extending edge, a circumferentially extending edge extending substantially perpendicularly from the front end of said longitudinally extending edge, and a circumferentially and longitudinally inclined edge extending between the opposite ends of said longitudinally and circumferentially extending edges;

a roller on said end of the lever engaged in said cam slot;

said cam member, when moved longitudinally in one direction, bringing its circumferentially extending edge into engagement with said roller to retract said second radial end projection of the lever out of said forwardly offset portion of the shank slot against the urging of said second spring means to permit said first spring means to immediately rotate said drive bushing, said lever and said drive gear in said one rotational direction, with said roller on the lever riding across said circumferentially extending edge of the cam slot from said longitudinally extending edge over to said inclined edge;

and said cam member, when moved longitudinally in the opposite direction, moving the inclined edge of the cam slot over said roller to turn the lever, said drive bushing and said drive gear in the opposite rotational direction against the urging of said first spring means until said second radial end projection of the lever registers with said forwardly offset portion of the shank slot, whereupon said second spring means forces said second radial end projection of the lever into said forwardly offset portion of the shank slot to lock the lever, said drive bushing and said drive gear against rotation relative to the shank and the frame.

References Cited

UNITED STATES PATENTS

| | | | |
|---|---|---|---|
| 2,704,950 | 3/1955 | Scott | 72—104 |
| 3,149,511 | 9/1964 | Warren | 72—121 X |
| 3,164,042 | 1/1965 | Hanna | 72—121 |

CHARLES W. LANHAM, *Primary Examiner.*

K. C. DECKER, *Assistant Examiner.*